(12) United States Patent
Gariepy et al.

(10) Patent No.: US 10,585,440 B1
(45) Date of Patent: Mar. 10, 2020

(54) SYSTEMS AND METHODS FOR USING HUMAN-OPERATED MATERIAL-TRANSPORT VEHICLES WITH FLEET-MANAGEMENT SYSTEMS

(71) Applicant: Clearpath Robotics Inc., Kitchener (CA)

(72) Inventors: Ryan Christopher Gariepy, Kitchener (CA); Matthew Allen Rendall, Waterloo (CA); Simon Drexler, Puslinch (CA); Roydyn Clayton, Seattle, WA (US); Shahab Kaynama, Mountain View, CA (US)

(73) Assignee: CLEARPATH ROBOTICS INC., Kitchener (CA)

( * ) Notice: Subject to any disclaimer, the term of this patent is extended or adjusted under 35 U.S.C. 154(b) by 49 days.

(21) Appl. No.: 15/877,299

(22) Filed: Jan. 22, 2018

Related U.S. Application Data

(60) Provisional application No. 62/449,264, filed on Jan. 23, 2017.

(51) Int. Cl.
*G05D 1/02* (2006.01)
*G05B 19/418* (2006.01)
*B66F 9/075* (2006.01)

(52) U.S. Cl.
CPC ....... *G05D 1/0289* (2013.01); *B66F 9/07581* (2013.01); *G05B 19/41895* (2013.01); *G05D 1/024* (2013.01); *G05D 1/0297* (2013.01)

(58) Field of Classification Search
CPC .................................................. G05D 1/0289
See application file for complete search history.

(56) References Cited

U.S. PATENT DOCUMENTS

| | | | |
|---|---|---|---|
| 5,199,524 A | 4/1993 | Ivancic |
| 5,581,250 A | 12/1996 | Khvilivitzky |
| 5,785,281 A | 7/1998 | Peter et al. |
| 5,983,161 A | 11/1999 | Lemelson et al. |
| 6,405,132 B1 | 6/2002 | Breed et al. |
| 7,409,356 B1 | 8/2008 | Geddes et al. |
| 7,826,919 B2 | 11/2010 | D'Andrea et al. |
| 7,894,932 B2 | 2/2011 | Mountz et al. |
| 7,894,933 B2 | 2/2011 | Mountz et al. |
| 7,912,574 B2 | 3/2011 | Wurman et al. |
| 8,220,710 B2 | 7/2012 | Hoffman et al. |
| 8,577,538 B2 | 11/2013 | Lenser et al. |
| 8,694,193 B2 | 4/2014 | Meakea et al. |
| 8,914,182 B2 | 12/2014 | Casado et al. |

(Continued)

*Primary Examiner* — Alex C Dunn
(74) *Attorney, Agent, or Firm* — Bereskin & Parr LLP/S.E.N.C.R.L., s.r.l.

(57) ABSTRACT

There is provided a driver-support system for use with a human-operated material-transport vehicle, and methods for using the same. The system has at least one sensor, a human-vehicle interface, and a transceiver for communicating with a fleet-management system. The system also has a processor that is configured to provide a mapping application and a localization application based on information received from the sensor. The mapping application and localization application may be provided in a single localization-and-mapping ("SLAM") application, which may obtain input from the sensor, for example, when the sensor is an optical sensor such as a LiDAR or video camera.

17 Claims, 7 Drawing Sheets

(56) References Cited

U.S. PATENT DOCUMENTS

| | | | |
|---|---|---|---|
| 8,930,133 B2* | 1/2015 | Wurman | G06Q 10/08 414/334 |
| 9,056,754 B2* | 6/2015 | Wong | G05D 1/0274 |
| 9,087,314 B2* | 7/2015 | Hoffman | G06Q 10/087 |
| 9,102,406 B2 | 8/2015 | Stark et al. | |
| 9,206,023 B2* | 12/2015 | Wong | B66F 9/063 |
| 9,487,356 B1 | 11/2016 | Aggarwal | |
| 9,519,284 B2* | 12/2016 | Wurman | G05B 19/4189 |
| 9,606,544 B2 | 3/2017 | Gariepy et al. | |
| 9,607,285 B1* | 3/2017 | Wellman | G06Q 10/087 |
| 9,610,510 B2* | 4/2017 | Comploi | A63G 25/00 |
| 9,671,791 B1 | 6/2017 | Paczan | |
| 9,740,212 B2* | 8/2017 | D'Andrea | G05B 19/41895 |
| 9,891,630 B2 | 2/2018 | Gariepy et al. | |
| 9,891,639 B2 | 2/2018 | Fort et al. | |
| 9,896,030 B2 | 2/2018 | Sugimoto | |
| 9,963,155 B2 | 5/2018 | Gariepy et al. | |
| 10,093,526 B2* | 10/2018 | D'Andrea | G06Q 10/08 |
| 10,120,390 B2 | 11/2018 | Gariepy et al. | |
| 2004/0158355 A1 | 8/2004 | Holmqvist | |
| 2005/0021195 A1* | 1/2005 | Zeitler | G05D 1/024 701/23 |
| 2007/0106473 A1 | 5/2007 | Bodin et al. | |
| 2007/0129847 A1 | 6/2007 | Ulmer et al. | |
| 2008/0018472 A1 | 1/2008 | Dasilva et al. | |
| 2008/0262669 A1 | 10/2008 | Smid et al. | |
| 2009/0043439 A1* | 2/2009 | Barfoot | G08G 1/20 701/25 |
| 2009/0074545 A1 | 3/2009 | Lert, Jr. | |
| 2009/0077808 A1 | 3/2009 | Malm | |
| 2009/0210109 A1 | 8/2009 | Ravenscroft | |
| 2009/0222134 A1 | 9/2009 | Franke et al. | |
| 2010/0030417 A1 | 2/2010 | Fang et al. | |
| 2011/0144828 A1 | 6/2011 | Chengalva | |
| 2012/0101627 A1 | 4/2012 | Lert | |
| 2012/0123614 A1* | 5/2012 | Laws | G05B 19/4189 701/2 |
| 2012/0179337 A1 | 7/2012 | Doan | |
| 2013/0000438 A1 | 1/2013 | Ouellet | |
| 2013/0054133 A1 | 2/2013 | Lewis et al. | |
| 2013/0086215 A1 | 4/2013 | Trotta et al. | |
| 2013/0142393 A1 | 6/2013 | Lord et al. | |
| 2013/0248547 A1 | 9/2013 | Braun et al. | |
| 2013/0311075 A1 | 11/2013 | Tran et al. | |
| 2014/0244097 A1 | 8/2014 | Colwell | |
| 2014/0277691 A1* | 9/2014 | Jacobus | G06Q 10/087 700/216 |
| 2014/0303768 A1 | 10/2014 | Klumpp et al. | |
| 2014/0303814 A1 | 10/2014 | Burema et al. | |
| 2014/0308098 A1 | 10/2014 | Lert et al. | |
| 2014/0344118 A1 | 11/2014 | Parpia et al. | |
| 2014/0350725 A1 | 11/2014 | Lafary et al. | |
| 2014/0360832 A1 | 12/2014 | Aldrich | |
| 2014/0365258 A1* | 12/2014 | Vestal | G06Q 10/063114 705/7.15 |
| 2015/0006005 A1 | 1/2015 | Yu | |
| 2015/0161872 A1 | 6/2015 | Beaulieu et al. | |
| 2015/0269860 A1 | 9/2015 | Shaw et al. | |
| 2015/0323699 A1 | 11/2015 | Gariepy et al. | |
| 2015/0326462 A1* | 11/2015 | Le | H04L 43/0894 370/252 |
| 2015/0379704 A1* | 12/2015 | Chandrasekar | G06K 9/00664 701/25 |
| 2016/0001775 A1 | 1/2016 | Wilhelm et al. | |
| 2016/0068267 A1 | 3/2016 | Liu et al. | |
| 2016/0070264 A1 | 3/2016 | Hu et al. | |
| 2016/0076892 A1 | 3/2016 | Zhou et al. | |
| 2016/0121487 A1 | 5/2016 | Mohan et al. | |
| 2016/0124434 A1 | 5/2016 | Gariepy et al. | |
| 2016/0129917 A1 | 5/2016 | Gariepy et al. | |
| 2016/0193999 A1 | 7/2016 | Sasabuchi | |
| 2016/0236867 A1 | 8/2016 | Brazeau et al. | |
| 2016/0266578 A1* | 9/2016 | Douglas | G05D 1/0225 |
| 2016/0304198 A1 | 10/2016 | Jourdan | |
| 2016/0318445 A1 | 11/2016 | Sugimoto | |
| 2016/0349749 A1 | 12/2016 | Gariepy et al. | |
| 2016/0349754 A1 | 12/2016 | Mohr et al. | |
| 2017/0036771 A1 | 2/2017 | Woodman et al. | |
| 2017/0039765 A1 | 2/2017 | Zhou et al. | |
| 2017/0076616 A1 | 3/2017 | Kanade et al. | |
| 2017/0102241 A1 | 4/2017 | Paduano et al. | |
| 2017/0121159 A1* | 5/2017 | Weiss | B66F 9/0755 |
| 2017/0195549 A1 | 7/2017 | Cao et al. | |
| 2017/0233231 A1 | 8/2017 | Gariepy et al. | |
| 2018/0053141 A1* | 2/2018 | Shydo, Jr. | G05D 1/104 |
| 2018/0139368 A1* | 5/2018 | Nakayama | H04N 5/235 |
| 2019/0094873 A1* | 3/2019 | Wei | G05D 1/0236 |
| 2019/0155275 A1* | 5/2019 | Akamatsu | G05D 1/0022 |
| 2019/0161274 A1* | 5/2019 | Paschall, II | B65G 1/0492 |

* cited by examiner

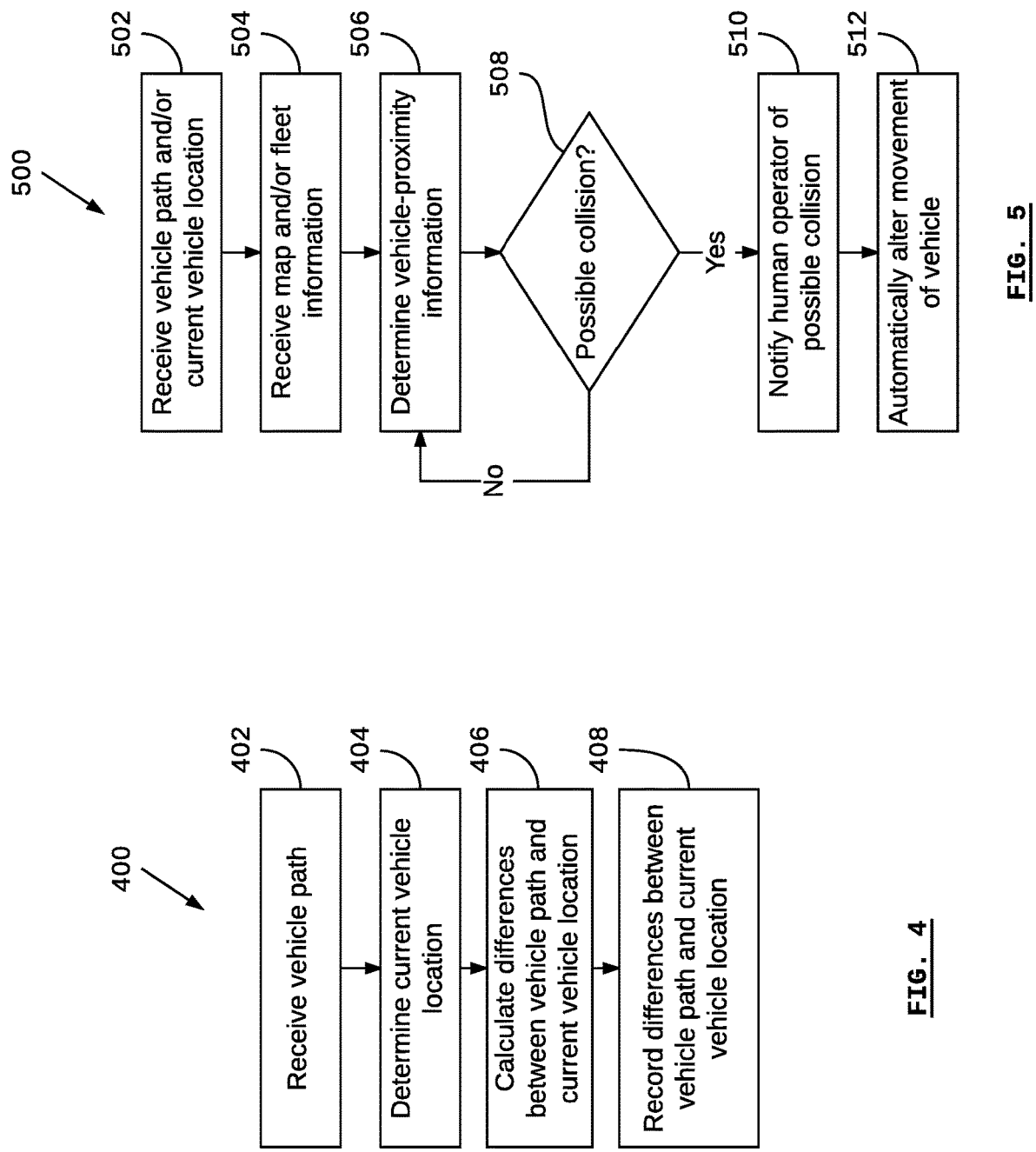

SYSTEMS AND METHODS FOR USING HUMAN-OPERATED MATERIAL-TRANSPORT VEHICLES WITH FLEET-MANAGEMENT SYSTEMS

CROSS-REFERENCE TO RELATED APPLICATIONS

This application claims priority to U.S. Provisional Patent Application No. 62/449,264 that was filed on 23 Jan. 2017, the contents of which are incorporated herein by reference.

FIELD

The described embodiments relate to using human-operated material-transport vehicles, and, in particular, to using human-operated material-transport vehicles with fleet-management systems.

BACKGROUND

Industrial facilities such as factories, manufacturing plants, and warehouses, have traditionally relied on human-operated material-transport vehicles to move parts, inventory, and materials within the facility. For example, human-operated material-transport vehicles can be used to provide line-side delivery of parts to a just-in-time assembly line.

Advancements in material-transport vehicles have included driverless vehicles such as automated-guided vehicles ("AGVs"). In some cases, AGVs may be used advantageously owing to a higher-degree of automation as compared to traditional material-transport vehicles.

However, despite technological advancements in certain types of material-transport vehicles, the need for human-operated material-transport vehicles remains. In some cases, certain types of automated or driverless material-transport vehicles lack the capabilities of traditional material-transport vehicles, such as the ability to lift and/or manipulate payloads of varying complexities, the ability to navigate quickly in tight spaces, the ability to recognize and react to complex situations, or the ability to drive anywhere within a facility without relying on a navigational strip or guide. While there may be some advantages to using driverless vehicles, many scenarios involving material-transport vehicles still rely on the skill and judgement of a human operator.

Furthermore, it is often prohibitively expensive to replace existing traditional material-transport vehicle fleets in their entirety, and, therefore, certain aspects of the material-transport vehicle infrastructure may be upgraded to newer types of material-transport vehicles, while existing traditional human-operated vehicles are left to coexist with the newer systems within a facility.

SUMMARY

In a first aspect, some embodiments provide a method of using a human-operated material-transport vehicle with a fleet-management system. The method comprises the steps of moving the human-operated vehicle within an industrial facility associated with the fleet-management system, using a driver-support system mounted on the vehicle to obtain vehicle-mission information, and transmitting the vehicle-mission information to the fleet-management system. The vehicle-support system comprises at least one sensor for determining vehicle location and/or vehicle velocity and a transceiver for communicating with the fleet-management system.

The vehicle-mission information may comprise at least one of vehicle location as determined by the at least one sensor and vehicle velocity as determined by the at least one sensor. In the event that the vehicle is moved within an industrial facility according to a vehicle mission, the vehicle-mission information may comprise a task status pertaining to the status of the mission According to some embodiments, the method may further comprise receiving fleet information from the fleet-management system. The fleet information may comprise vehicle-mission information pertaining to at least one other vehicle in the fleet. In some cases, another vehicle in the fleet may be a driverless vehicle. In some cases, there may be two or more other vehicles in the fleet, in which case, receiving fleet information from the fleet-management system may comprise receiving a broadcast stream from the fleet-management system comprising an aggregation of location and speed information pertaining to each of two other vehicles in the fleet. Furthermore, according to some embodiments, the fleet information may be provided to a human operator of the human-operated material-transport vehicle.

According to some embodiments, the method further comprises receiving vehicle-mission information from at least one other vehicle in the fleet. In some cases, at least one other vehicle in the fleet may be a driverless vehicle. Furthermore, the vehicle-mission information may be provided to an operator of the vehicle.

According to some embodiments, the method further comprises receiving a destination location and using the driver-support system to plan a path for the vehicle based on the destination location. In some cases, the method may comprise receiving fleet information, in which case using the driver-support system to plan the path for the vehicle is based on a map provided by the driver-support system and the fleet information.

According to some embodiments, the driver-support system is used to track a movement of the vehicle relative to the path planned for the vehicle.

According to some embodiments, the destination location is received from the fleet-management system.

According to some embodiments, the destination location is received from an operator of the vehicle using a human-vehicle interface.

According to some embodiments, the method further comprises adapting a sensor of the driver-support system based on the path of the vehicle.

According to some embodiments, the method further comprises using the driver-support system to determine vehicle-proximity information associated with the vehicle, and using the driver-support system to perform collision-avoidance based on the vehicle-proximity information.

According to some embodiments, the method further comprises using a human-vehicle interface to alert an operator of the vehicle in response to a possible collision with another vehicle.

According to some embodiments, the method further comprises receiving information from the fleet-management system pertaining to a possible collision with another vehicle.

According to some embodiments, the method further comprises using a vehicle-control interface to alter a motion of the vehicle in response to a possible collision with another vehicle.

In a second aspect, some embodiments provide a driver-support system for mounting on a human-operated material-transport vehicle. The system comprises at least one sensor in communication with a processor, a human-vehicle interface in communication with the processor, and a transceiver in communication with the processor, for communicating with a fleet-management system. The processor is configured to provide a mapping application and a localization application based on information received from the at least one sensor.

According to some embodiments, the processor is configured to provide the mapping application and the localization application using a simultaneous localization and mapping ("SLAM") application.

According to some embodiments, the processor is further configured to provide a path-planning application for planning a vehicle path based on a destination location.

According to some embodiments, the processor is further configured to provide a path-tracking application for tracking a movement of the vehicle relative to the vehicle path.

According to some embodiments, the processor is further configured to provide a collision-avoidance application for predicting possible collisions between the vehicle and a second vehicle.

According to some embodiments, the processor is further configured to provide a strategy-management application for processing information pertaining to a vehicle mission.

According to some embodiments, the system further comprises a task-input device for receiving task-status information from a vehicle operator pertaining to the vehicle mission.

According to some embodiments, the system further comprises a vehicle-control interface for at least one of sending vehicle control information to the vehicle, and receiving vehicle control information from the vehicle.

BRIEF DESCRIPTION OF THE DRAWINGS

A preferred embodiment of the present invention will now be described in detail with reference to the drawings, in which:

FIG. 4 is a flow diagram showing a method for tracking the path of a vehicle, according to some embodiments;

FIG. 5 is a flow diagram showing a method for avoiding a collision, according to some embodiments;

DESCRIPTION OF EXEMPLARY EMBODIMENTS

Figure 1:
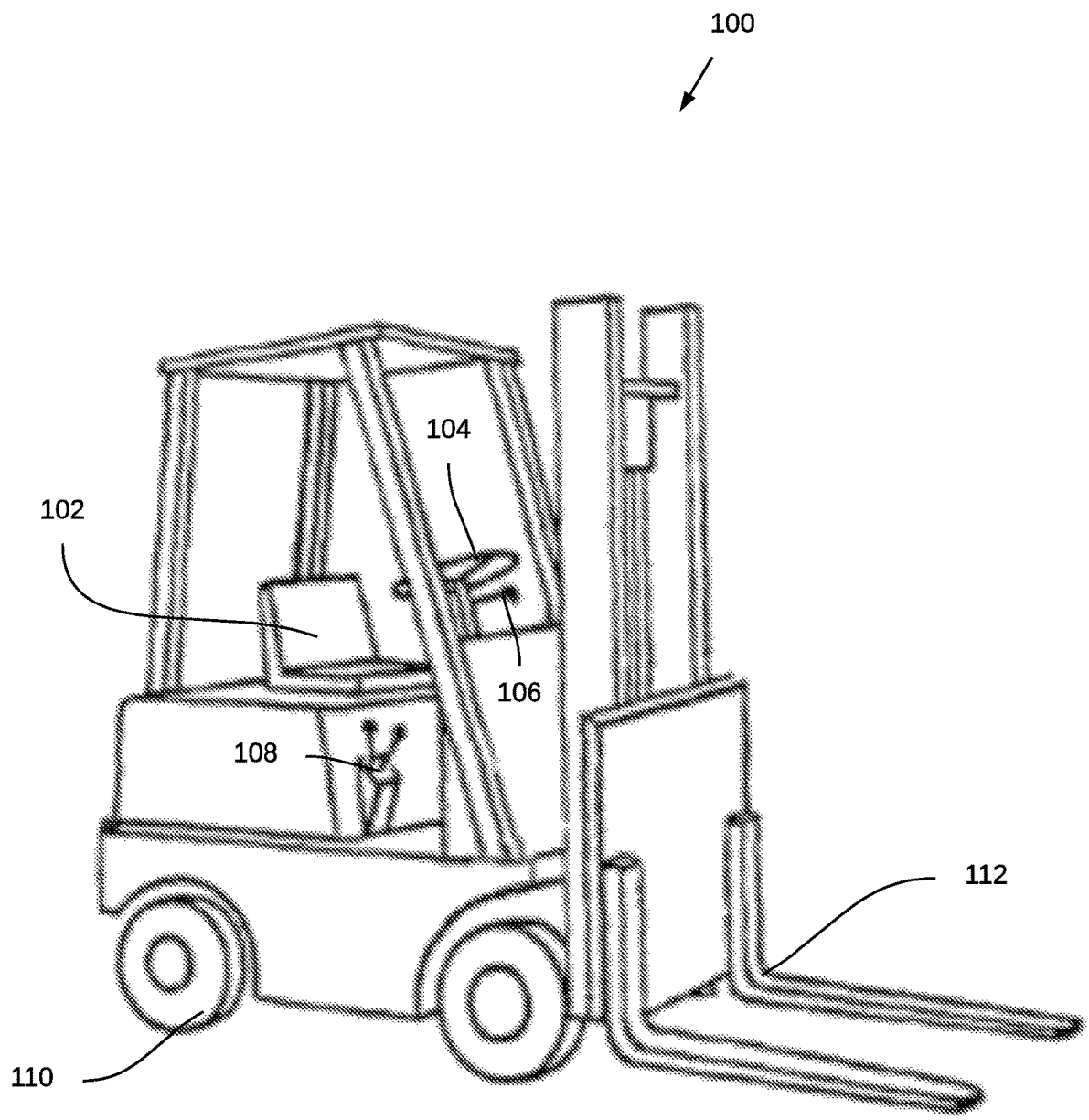
FIG. 1 is an orthographic view of a forklift human-operated material-transport vehicle according to the prior art.

Human-operated material-transport vehicles have previously been used as stand-alone vehicles whose control, navigation, path-planning, environmental awareness, and operation have been the exclusive domain of the vehicle's human operator. Referring to FIG. 1, there is shown a forklift 100 according to known prior art. The forklift 100 is operated by a human operator who sits on a seat 102, and uses a steering wheel 104, lever 106, levers 108, and foot pedals (not shown) in order to operate the forklift 100, such as by controlling the wheels 110 and the lifting fork 112.

Figure 2:
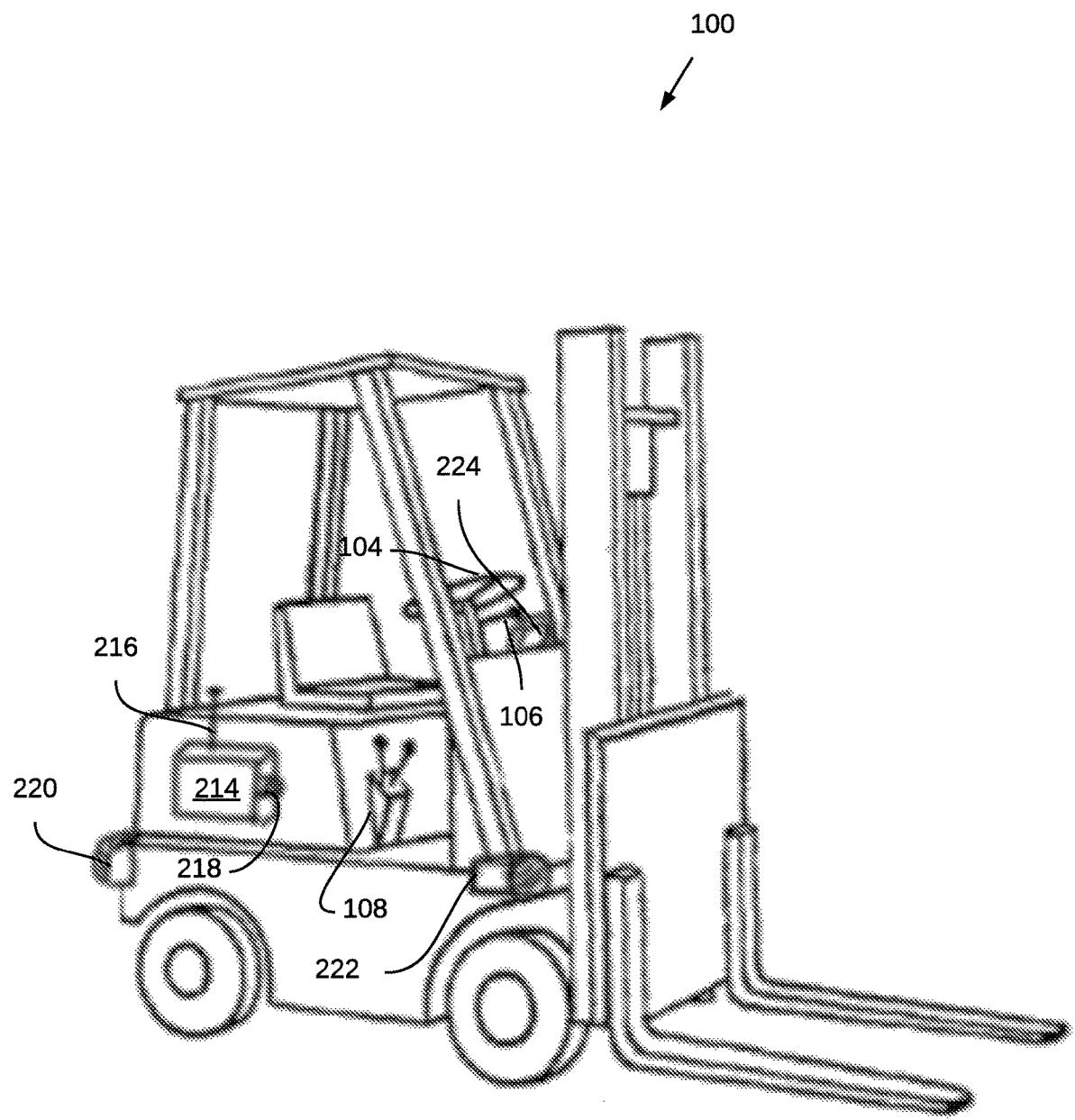
FIG. 2 is an orthographic view of the forklift of FIG. 1 equipped with a driver-support system according to some embodiments.

Referring to FIG. 2, there is shown the forklift 100 equipped with a driver-support system according to some embodiments. The driver-support system includes a housing 214 that contains a computer (e.g. processor, memory, non-transient computer-readable media), and a transceiver so that the computer can communicate with another computer system such as a fleet-management system. The transceiver may include an antenna 216.

The driver-support system also includes sensors of various types placed on the forklift 100. For example, the sensor 222 may be an optical sensor (including a LiDAR device) placed at the front of the forklift 100, and the sensor 220 may be a sonar device placed at the rear of the forklift 100. Some sensors, such as the sensor 218 may be included in the housing 214 itself. As will be appreciated, depending on the type of sensor used, it may be necessary to place the sensor on the forklift 100 in a location that allows for a sufficiently unobstructed field-of-view for the sensor.

According to some embodiments, the driver-support system may also include a component of a human-vehicle interface that was not part of the original equipment of the forklift 100. For example, a computer touch-screen display 224 may be mounted so as to be usable by the human operator, in order to display information from the driver-support system to the human operator, and/or capture input to the driver-support system from the human operator.

Figure 3:
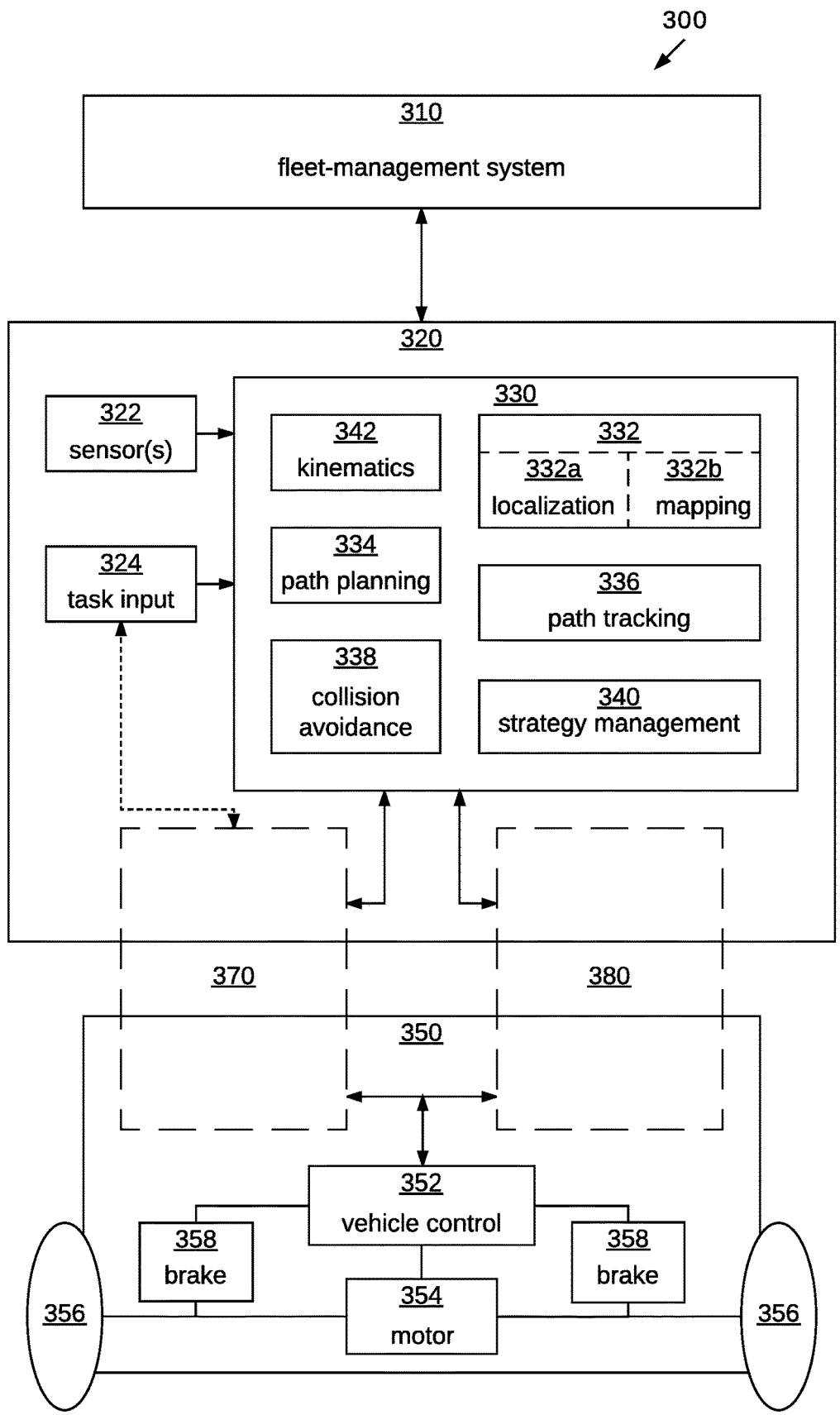
FIG. 3 is a block diagram showing a system for using a human-operated material-transport vehicle with a fleet-management system, according to some embodiments.

Referring to FIG. 3, there is shown a system 300 for using a human-operated material-transport vehicle with a fleet-management system. The system comprises a human-operated material-transport vehicle 350, fleet-management system 310, and a driver-support system 320.

As referred to herein, the term "human-operated material-transport vehicle" (e.g. the vehicle 350 in FIG. 3) refers to any vehicle that is used in an industrial setting to move materials from one place to another, such as by carrying, pushing, pulling, lifting, stacking, and organizing the materials in tiers. Examples include, but are not limited to industrial trucks (both powered and manual) such as forklifts, lift trucks, tuggers, tractors, platform lift trucks, hand trucks (powered and manual), pallet trucks and pallet jacks. Human-operated material-transport vehicles can be ridden by a human operator, or controlled by a walking human operator.

Furthermore, the term "human operated" is used to refer to traditional vehicles in which a human is required to steer, navigate, and/or otherwise control the speed and/or travel path of the vehicle. In other words, human-operated vehicles are vehicles with a relatively low degree of automation or autonomy. While it may be argued that highly-autonomous vehicles are "human operated" because a human may be required, for example, to install and supervise an automated system, this is not what is meant by "human operated" herein. Thus, vehicles such as self-driving vehicles and automated-guided vehicles (sometimes collectively or individually referred to as "unmanned" vehicles) are excluded from the definition of "human-operated vehicle". The term "driverless vehicles" is used to exclude human-operated vehicles, and to include vehicles with a higher-degree of automation or autonomy, such as automated-guided vehicles and self-driving vehicles.

The human-operated material-transport vehicle 350 has a vehicle drive system (not numbered in FIG. 3) that enables the drive and steerage of the vehicle 350. The vehicle drive system comprises a motor 354 that drives wheels 356. The motor 354 may be an electric motor, but may also be a combustion engine, or comprise a hybrid (electric motor and combustion engine) drive.

According to some embodiments, the vehicle 350 may include brakes 358 (or, in some cases, a single brake). For example, depending on the type of motor 354 that is used, the brakes 358 may be necessary in order to decelerate the vehicle 350, or deceleration of the vehicle 350 may be accomplished with the motor 354 itself via forms which are known to those skilled in the art such as regenerative or resistive braking.

The vehicle 350 also includes a vehicle control system 352. The vehicle control system 352 may be a mechanical system, an electrical system, or a combination of electrical and mechanical systems. For example, the vehicle control system 352 may provide a throttle in order to accelerate the motor 354. Such a throttle may be provided by mechanical means, or by an electrical signal that controls the speed of the motor 354, or by a combination of mechanical means and an electrical signal.

The system 300 further comprises a human-vehicle interface 370 and a vehicle-control interface 380. Both the human-vehicle interface 370 and the vehicle-control interface 380 are shown with dashed lines in FIG. 3 in order to indicate that part or all of each of the human-vehicle interface 370 may be included on the vehicle 350 or the driver-support system 320, and that part of the vehicle-control interface 380 may be included on the vehicle 350 or the driver-support system 320, according to some embodiments. The human-vehicle interface 370 and the vehicle-control interface 380 are introduced here, and will be described in more detail below.

For example, according to some embodiments, a steering wheel, accelerator foot pedal, and brake foot pedal that are a part of the vehicle 350 may be considered part of the human-vehicle interface 370. In the case that the brakes 358 were designed for the vehicle 350 such that they are activated by mechanical actuation of the brake foot pedal, then, in order for the driver-support system to activate the brakes 358, the vehicle-control interface 380 may require an electro-mechanical actuator in order to convert electrical signals from the driver-support system 320 into mechanical actuation for the brakes 358. Similarly, electro-mechanical conversion (and vice-versa) may be required by either the human-vehicle interface 370 or the vehicle-control interface 380 for use with any of the components of the vehicle 350 or the driver-support system 320.

The human-vehicle interface 370 may comprise various human-interface devices, in addition to a steering wheel, foot pedals, etc. For example, the human-vehicle interface 370 may include electrical-input human-interface devices such as buttons and switches, as well as annunciators such as lights audio speakers. Furthermore, the human-vehicle interface 370 may include human-interface devices such as computer displays, touch screens, keyboards, speakers, and microphones for receiving voice commands from the driver.

The driver-support system 320 is generally responsible for enhancing the automation and/or autonomy of the human-operated material-transport vehicle 350. The driver-support system 320 includes at least one sensor 322 and a computer 330. As used herein, the term "driver" in "driver-support system" is synonymous with the term "operator", and describes the human operator of a human-operated vehicle.

The driver-support system 320 also includes a transceiver for communicating with the fleet-management system 310. The transceiver is not shown in FIG. 3 for simplicity of illustration. The transceiver may be any type of communications transceiver for sending and receiving communications signals to and from the fleet-management system 310. For example, the transceiver may be used for implementing a Wi-Fi protocol over a local-area-network ("LAN") such as an IEEE 702.11 protocol. In some cases, part or all of the fleet-manager system 310 may be a part of the LAN, and in some cases, part or all of the fleet-manager system may be in communication with the LAN through another network, such as the Internet or a wide-area network ("WAN").

The driver-support system 320 may include a sensor or sensors. Unless otherwise provided, the singular or plural of "sensor" may be used interchangeably here. For example, some embodiments may rely on a single sensor whereas other embodiments may rely on an equivalent plurality of sensors.

According to some embodiments, the sensor 322 may be a range-finding sensor that is capable of measuring a distance to an object. Examples of sensors that may be used for the sensor 322 include but are not limited to optical sensors (e.g. LiDAR and video cameras), acoustic sensors (e.g. sonar), and electromagnetic or radio sensors (e.g. radar). Additionally, or alternatively, the sensor 322 may be capable of measuring a speed relative to an object. For example, any of the previously-described sensors may be configured to measure speed by measuring the Doppler shift of a signal reflected from the object.

According to some embodiments, the driver-support system 320 may include a plurality of sensors 322, which may be all of the same type, or of more than one type. For example, a sensor array comprising a plurality of sensors may be used in order to achieve a single measurement.

A plurality of individual sensors may also be placed in different locations on the vehicle in order to make multiple measurements simultaneously (e.g. in different directions and/or at different ranges). For example, the driver-support system 320 may include a sensor 322 placed on the front of the vehicle 350 in order to measure distances (and/or speeds) in front of the vehicle, as well as a sensor 322 placed on the rear of the vehicle 350 in order to measure distances (and/or speeds) behind the vehicle. In some cases, both of these sensors may be of the same type (e.g. the front sensor 322 and the rear sensor 322 may both use LiDAR), whereas, in other cases, each of these sensors may be of different types (e.g. the front sensor 322 may use LiDAR, and the rear sensor 322 may use sonar). Similarly, the driver-support system 320 may include sensors 322 placed on the sides of the vehicle 350, or the corners of the vehicle 350.

In some embodiments, more than one type of sensor may be used for the sensors 322 placed at the same place on the vehicle 350. For example, and as will be explained in further detail below, a first sensor 322 attached to the front of the vehicle 350 may be an optical sensor using LiDAR or a video camera, for use with mapping of the vehicle's environment, and/or localization within that environment. A second sensor 322 may also be attached to the front of the vehicle 350, such as adjacent to the first sensor, and may be a sonar sensor for use with collision avoidance.

According to some embodiments, the driver-support system 320 may also include a task-input device 324. The task-input device 324 may be used by the human operator of the vehicle 350 in order to update the status of tasks related to a mission to which the vehicle 350 has been assigned.

The task-input device 324 may be a discrete device (e.g. a stand-alone button or set of buttons), or the task-input device 324 may be a part of the human-vehicle interface 370. For example, the human-vehicle interface 370 may include a user interface such as a touch screen, button, a keypad, etc., that comprise original equipment for the vehicle 350 that has been adapted for use with the driver-support system 320, or the human-vehicle interface 370 may include a user interface that is supplemental to the original equipment of the vehicle 350, but that provides a variety of uses, including as a task-input device 324. As indicated by the stippled line in FIG. 3, in some cases, the task-input device 324 may be a separate device from the human-vehicle interface 370, but may communicate with the computer via the human-vehicle interface 370.

The task-input device 324 may be used, for example, by a human operator of the vehicle 350 to indicate that a task has been completed. For example, the task-input device 324 may be a button that is pressed by the human operator to indicate that a task has been completed. In other examples, the task-input device 324 may allow the human operator to input other information, such as the dimension of a payload that was picked up or dropped off, information identifying the payload that was picked up or dropped off, information identifying the task that was completed, how the task was completed, by whom, etc.

According to some embodiment, the task-input device 324 may automatically provide task-status information. For example, if the vehicle 350 is on a mission to deliver a payload to a destination location, then the task-input device 324 may automatically provide status information based on mapping and localization when the vehicle has passed milestones towards the destination location. (E.g. a task may be defined as driving halfway to the destination location, and, based on information pertaining to localization and mapping, the task-input device 324 may automatically update the task status to indicate that the vehicle 350 is half way to the destination location).

The driver-support system 320 includes a computer 330. A person skilled in the art will appreciate that the computer comprises a processor, memory, non-transient computer-readable media, and other computer components. The computer provides computer applications, for example, in the form of instructions stored on non-transient computer-readable media, which, when executed by the processor, provide the application.

The computer 330 provides a localization application 332a and a mapping application 332b. The mapping application 332b stores, creates, or otherwise provides a map of the environment in which the vehicle 350 is operating. For example, if the vehicle 350 is being used in a factory, then the mapping application 332b provides a map of the factory. According to some embodiments, the map may be provided to the mapping application 332b by the fleet-management system 310. In some embodiments, the mapping application 332b may create or generate the map based on information provided by the sensor 322. In other cases, the map may be provided as a combination of information supplied by the fleet-management system 310 and generated by the mapping application 332b on the computer 330 that is a part of the driver-support system 320.

The localization application 332a determines a location of the vehicle 350 relative to the map provided by the mapping application 332b, at any given time, based on information provided by the sensor 322. For example, the localization application 332a may determine the location of the vehicle 350 based on recognizing objects detected by the sensor 322, and/or by updating the location of the vehicle 350 based on a previously-known location and the velocity of the vehicle 350 and the time since the previously-known location.

According to some embodiments, a simultaneous location-and-mapping ("SLAM") application 332 may be used that, as a single application, effectively includes both the localization application 332a and the mapping application 332b. While, in practice, a single SLAM application 332 may be used, reference is made here to the individual components of localization 332a and mapping 332b for ease of explanation, even in the event that a single SLAM application 332 is used. In other cases, a single SLAM application 332 may not be available to the computer 330, but individual versions of a localization application 332a and mapping application 332b may still be used.

According to some embodiments, the computer 330 may also include a path-planning application 334. The path-planning application 334 calculates a suggested or optimal path for the vehicle 350 to take to a destination location. The path-planning application 334 may use the map from the mapping application 332b in order to plan the vehicle path. In some embodiments, the path-planning application 334 may use fleet information provided by the fleet-management system 310 that includes the location and/or velocity of other vehicles in the fleet. In some cases, the other vehicles in the fleet may include both human-operated material-transport vehicles adapted for use with a fleet-management system as well as driverless vehicles.

For example, the path-planning application 334 may determine an optimized vehicle path based on the known features of the map, and then may iterate the determination of the optimized vehicle path based on updated fleet information. In some cases, the path-planning application may periodically, intermittently, or continuously adjust or re-plan the vehicle path based on updated map information and/or updated fleet information.

According to some embodiments, the computer 330 may also include a path-tracking application 336. The path-tracking application 336 can be used to determine how the vehicle 350 is actually moving relative to the vehicle path provided by the path-planning application 334. In some cases, the path-planning application 334 may be optional, and a vehicle path may be planned by the fleet-management system 310 (or other remote system), and may be provided to the driver-support system 320 through the transceiver. In either case, the path-tracking application 336 assumes that the driver-support system 320 has a vehicle path against which the movements of the vehicle 350 can be tracked.

The path-planning application 334 may operate by receiving information from the sensor 322, and/or from the localization application 332a, in order to determine a location of the vehicle 350 at any particular moment.

Referring to FIG. 4, there is shown a path-tracking algorithm 400. A person skilled in the art will appreciate that various steps in the algorithm may be performed in different sequences while still achieving a path-tracking algorithm.

The algorithm 400 is an example of an algorithm that may be implemented by the path-tracking application 336.

The algorithm 400 starts at step 402, when the path-tracking algorithm 400 receives a vehicle path. The vehicle path may be provided by any combination of the fleet-management system 310 (or another remote system), and the path-planning application 334.

According to some embodiments, the vehicle path may also be received by, or altered by information provided to the driver-support system 320 from the human-vehicle interface 370 and/or the vehicle-control interface 380. For example, the path-tracking algorithm 400 may receive information related to changes in the steering or speed of the vehicle 350. In some cases, this may include detecting changes made by the human operator to the position of the steering wheel and/or foot pedals using position sensors included in the human-vehicle interface 370. In some cases, this may include detecting changes to the position of the wheels 356 and/or speed of the motor 354, as reported by the vehicle-control interface 380 to the path-tracking algorithm 336.

At step 404, the algorithm 400 determines the current location of the vehicle 350. This may be accomplished by any combination of location information received from the localization application 332a (which may be a part of a single SLAM application 332), and information obtained directly from the sensor 322, and vehicle-proximity information.

At step 406, the algorithm 400 calculates the difference between the vehicle path received during step 402, and the actual (current) vehicle location determined at step 404. For example, this may include determining the expected vehicle location based on the received vehicle path, the expected or current velocity of the vehicle 350, and the current time, and then measuring a difference between the expected vehicle location and the actual vehicle location determined at step 404. It may also include a direct observation of salient features of the environment which represent the path, whether these features are directly representative (ex. a marked aisle) or indirectly representative (ex. a set of previously learned visual keyframes).

At step 408, the algorithm 400 records the differences between the vehicle path and the current location. According to some embodiments, the differences between the vehicle path and the current location may be recorded as a simple binary difference (e.g. "on path" or "off path"). According to some embodiments, the differences may be recorded as the calculated distance and/or time between the (expected) vehicle path and the actual vehicle location. Recording the differences between the vehicle path and the vehicle location may include notifying a human operator of the vehicle 350 in real-time, such as through the human-vehicle interface 370, that the vehicle 350 is off of the vehicle path, and/or by how much the vehicle 350 is off the vehicle path.

According to some embodiments, the computer 330 may also include a collision-avoidance application 338. The collision-avoidance application 338 can be used to attempt to avoid, mitigate, or diminish the impacts of collisions between the vehicle 350, other vehicles in the vehicle fleet (which may include both human-operated vehicles and driverless vehicles), other moving objects (such as human pedestrians), and stationary objects (e.g. walls, shelves, and other infrastructure).

Referring to FIG. 5, there is shown a collision-avoidance algorithm 500 (that can also be performed as a method). A person skilled in the art will appreciate that various steps in the algorithm may be performed in different sequences while still achieving a collision-avoidance algorithm. The algorithm 500 is an example of an algorithm that may be implemented by the collision-avoidance application 338.

The algorithm 500 starts at step 502, when the vehicle path and/or current vehicle location are received. As previously described, the vehicle path may be provided by any combination of the fleet-management system 310 (or another remote system), and the path-planning application 334, and the current vehicle location may be provided by any combination of location information received from the localization application 332a (which may be a part of a single SLAM application 332), and information obtained directly from the sensor 322, and vehicle-proximity information.

At step 504, the algorithm 500 receives a map and/or fleet information. The map may receive by any combination of the fleet-management system 310 and the mapping application 332b (or a SLAM application 332), and the fleet information may be received by any combination of the fleet management system 310 (e.g. through a broadcast stream), or directly from other vehicles in the fleet (which may include transmission via the fleet-management system 310).

At step 506, the algorithm 500 determines vehicle-proximity information. Vehicle-proximity information includes information about any objects that are within a certain proximity of the vehicle 350. As such, the proximity by which the vehicle-proximity information is defined can be arbitrarily selected, for example, in order to accomplish the object of collision avoidance. For example, if the maximum speed of any moving object in the environment is expected to not exceed 2 m/s, and if it is desired to anticipate a possible collision at least 2 seconds in advance of the possible collision, then a proximity of at least 4 meters should be selected.

According to some embodiments, the algorithm 500 may determine that an object is within the proximity based on objects known in the map received at step 504. For example, if the map includes a wall, the algorithm 500 may determine that the wall is within the proximity based on the path and/or current vehicle location received at step 502, and the map received at step 504.

In some cases, the algorithm 500 may also consider the velocity and/or direction of travel of the vehicle in order to determine whether an object is within the proximity. In other words, the area around the vehicle 350 defined by the proximity, as defined, may not necessarily be a disc, or be otherwise symmetrically disposed about the vehicle 350. Rather, the proximity may be defined such that it is greater in the direction of travel of the vehicle 350 (e.g. in front of and/or behind the vehicle 350). Thus, in the above example of a wall known on the map, the collision-avoidance algorithm 500 may only consider the wall to be within the vehicle-proximity information when the location and velocity (or direction) of the vehicle 350 is such that the vehicle 350 is actually driving towards the wall.

According to some embodiments, the algorithm 500 may determine that another vehicle in the fleet is within the proximity based on the current location and velocity (or vehicle path) of the other vehicle. For example, the fleet-manager system 310 may determine that the vehicle 350 is on a collision course with another vehicle in the fleet, in which case, determining the vehicle-proximity information at step 506 may include receiving vehicle-proximity information from the fleet-manager system 310.

In other cases, the driver-support system 320 may determine that the vehicle 350 is on a collision course with another vehicle in the fleet based on fleet information received from the fleet-management system 310. In this case, determining the vehicle-proximity information at step 506 may include determining whether the vehicle 350 is on a collision course with another vehicle in the fleet.

In the case of avoiding collisions with moving objects such as other vehicles in the fleet, the definition of the proximity by which the vehicle-proximity information is defined may be different than for stationary objects. For example, if the maximum speed of any vehicle is not expected to exceed 2 m/s, and if it is desired to anticipate a possible collision at least 2 seconds in advance of the possible collision, then a proximity of at least 8 meters for other moving vehicles should be selected.

According to some embodiments, determining vehicle-proximity information at step 506 may include using the sensor 322 to determine whether an object is within the proximity, without relying on the map, fleet information, and/or vehicle path. In this case, the sensor 322 used to determine vehicle-proximity information may be the same as the sensor 322 used by the SLAM application 332, or it may be a different sensor 322. Thus, in some cases, determining vehicle-proximity information at step 506 may involve simply identifying any object detected by the sensor 322 within a certain proximity (i.e. range).

At step 508, the algorithm 500 determines whether there is an object within the vehicle proximity, and/or whether there is another vehicle (or moving object) on a collision course with the vehicle. According to some embodiments, the definition of the proximity (and the resulting area around the vehicle defined by the proximity) determines the scenarios that will be deemed to be possible collision scenarios. In other words, the proximity can be selected such that whenever an object is within the proximity, a possible collision with that object is determined.

If, at step 508, it has been determined that there is a possible collision scenario, then the method continues to step 510. If no collision scenario has been determined, then the method may return to any of the previous steps, for example, step 506.

At step 510, the algorithm 500 notifies a human operator of the vehicle 350 that a possible collision has been anticipated. For example, the human-vehicle interface 370 may be used to notify the human operator that a potential collision has been anticipated. In some cases, this may include activating an annunciator in order to warn the human operator. In some cases, this may include displaying a map-view of the environment, and visually indicating the object on the map (or another vehicle in the fleet superimposed on the map) with which the possible collision is anticipated to occur.

At step 512, the algorithm 500 may automatically alter the movement of the vehicle 350 in response to a possible collision that has been anticipated. For example, the vehicle-control interface 380 may be used to activate the brakes 358, change the speed of the motor 354, and/or steer the wheels 356.

According to some embodiments, the computer 330 may also include a strategy-management application 340. The strategy-management application 340 can be used to communicate with the fleet-management system 310 with respect to the vehicle's missions and tasks, and to manage the vehicle's missions and tasks using the driver-support system 320. For example, the strategy-management application 340 may receive a mission or task from the fleet-management system 310, and may then provide a destination location to the path-planning application 334. Additionally, the strategy-management application 340 may receive information from the task-input device 324, for example, when a human operator uses the task-input device 324 to indicate that a task status has changed. Similarly, if automated task-status changes are being used, as previously described (e.g. to indicate when the vehicle 350 is half-way to its destination location), the automated task-status changes can be managed by the strategy-management application 340.

According to some embodiments, the computer 330 may also include a kinematics application 142. The kinematics application 142 can be used to store and access information pertaining to the kinematics of a particular vehicle 350. Since, according to some embodiments, the driver-support system 320 may be designed for use with a variety of types of human-operated material-transport vehicles, various aspects of the driver-support system 320 may need to be configured for use with any particular vehicle or vehicle type. For example, the parameters used by the collision-avoidance application 338 (e.g. the proximity that defines the vehicle-proximity information) may be dependent on the mass, speed, acceleration/deceleration, turning radius, braking, etc. characteristics of a particular vehicle 350. Similarly, the path-planning application 334 may be dependent on the speed, turning radius, and physical dimensions of a particular vehicle 350.

The kinematics application 142 can also be used to configure the vehicle-control interface 380 for a particular vehicle 350 so that the driver-support system 320 can provide appropriate control signals to the vehicle-control system 352 as necessary.

According to some embodiments, the driver-support system 320 system can be designed for implementation on a variety of vehicle types, such that only a different kinematics application 142 is needed for each vehicle type.

Figures 6A, 6B:
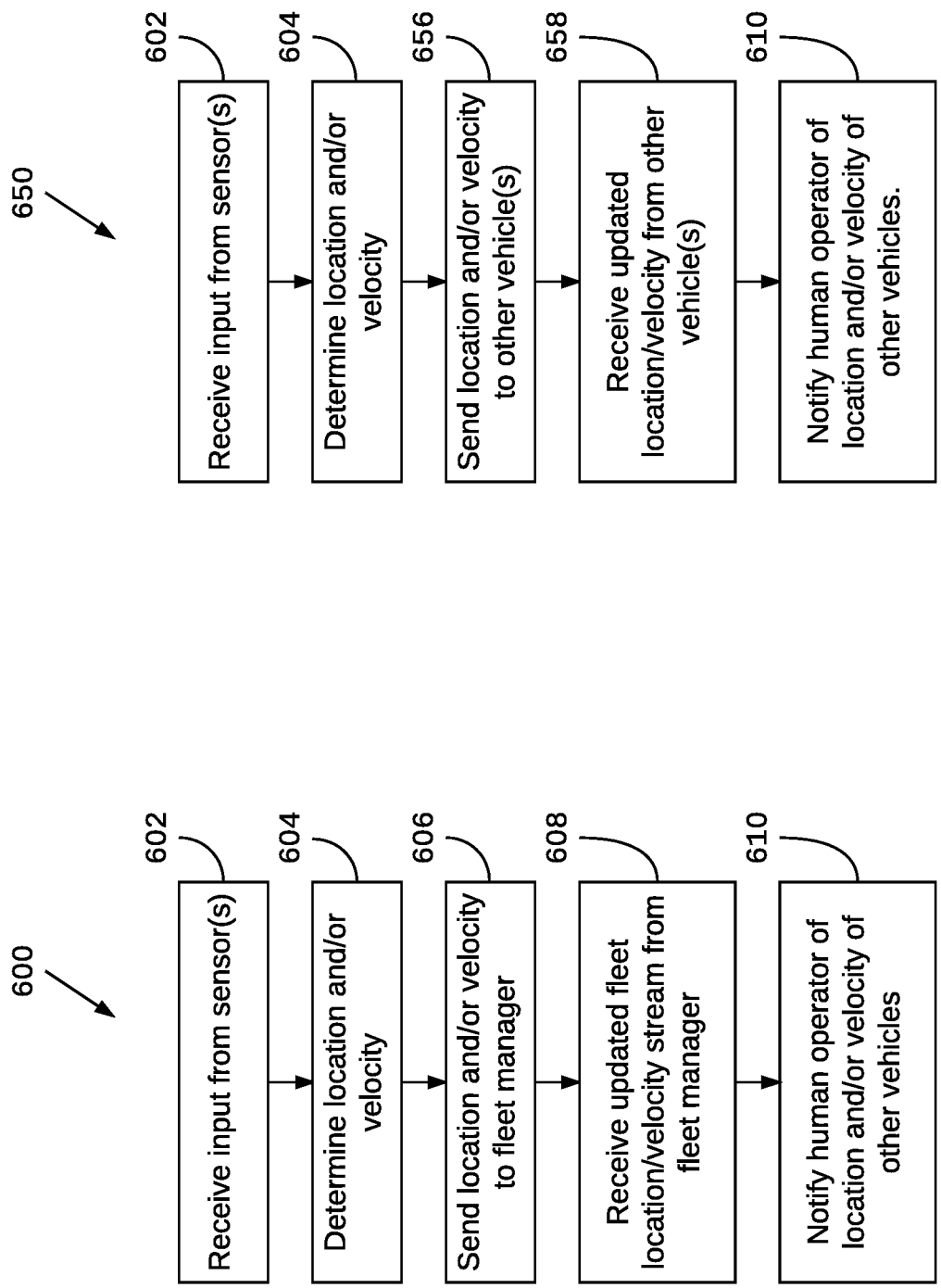
FIG. 6A is a flow diagram showing a method for providing information obtained from a single vehicle to other vehicles within a fleet of vehicles, according to some embodiments.
FIG. 6B is a flow diagram showing a method for providing information obtained from a single vehicle to other vehicles within a fleet of vehicles, according to some embodiments.

Referring to FIG. 6A and FIG. 6B, there are shown methods 600, and 650, respectively, for providing information obtained from a single vehicle to other vehicles within the fleet of vehicles. A person skilled in the art will appreciate that various steps in the methods may be omitted or performed in different sequences while still achieving methods for providing information obtained from a single vehicle to other vehicles with a fleet of vehicles. The methods 600 and 650 are generally similar, but vary in particular implementation, for example, the manner in which the information is communicated to other vehicles within the fleet of vehicles.

Each of the methods 600 and 650 begin at step 602, in which input is obtained from a sensor or sensors attached to the vehicle. For example, in some embodiments, the sensor or sensors may be the sensors 322 as previously described.

The sensors are used to determine any one of distance, displacement, speed, and velocity, as well as other characteristics of the vehicle's movement and the environment in which the vehicle moves.

For example, a LiDAR, radar, or sonar device may be used to measure the distance between the vehicle and an object (e.g. a wall). When the distance is measured at two different times, then the speed of the vehicle relative to the object can be easily determined. In some cases, the distance may be measured by periodically or intermittently using the LiDAR, radar, or sonar device. Additionally, or alternatively, the sensors may directly measure the speed of the vehicle relative to the object, such as by detecting a Doppler shift.

At step 604, the location of the vehicle can be determined, along with the velocity (or speed) of the vehicle. For the purposes of step 604, determining velocity is effectively equivalent to determining speed. The location of the vehicle is determined with reference to a map. For example, the location of the vehicle can be determined by the localization application 332a, based on the map provided by the mapping application 332b. In some embodiments, the determination of the location of the vehicle may be accomplished based on the velocity of the vehicle (e.g. from a known point on the map using dead reckoning or deduced reckoning). In some embodiments, the determination of the location of the vehicle may be accomplished based on the measured distance from a known object on the map or navigational sign or beacon.

In some implementations, the determination of location may be of greater importance or relevance than the determination of velocity; and vis-versa. For example, in some implementations, it may be valuable to know the general location of a vehicle (or whether a vehicle is within the vicinity of a location on the map) in order to determine whether and how other vehicles should be dispatched to the location. In some implementations, it may be valuable to know the speed of the vehicle, in order to assess the impacts of the vehicle on the safety or efficiency of the facility or process in which the vehicle participates.

Once the location and/or velocity of the vehicle has been determined at step 604, then the location and/or velocity of the vehicle can be communicated to other vehicles in the fleet.

Referring to FIG. 6A, at step 606, the method 600 sends the location and/or velocity information to the fleet manager so that the fleet manager can compile a broadcast stream comprising the location and/or velocity information of multiple vehicles. Then, at step 608, the broadcast stream is broadcast to other vehicles in the fleet.

At step 608, the vehicle receives the broadcast stream from the fleet manager, and thereby receives updated location and/or velocity information for other vehicles in the fleet. According to some embodiments, the broadcast stream may be received periodically or intermittently. Each broadcast stream update received generally includes all of the updated location and/or velocity information received by the fleet manager from other vehicles since the last broadcast stream update was received. In some cases, if the fleet manager does not receive an update of location and/or velocity from a particular vehicle, then broadcast stream may include the last-known location and/or velocity for that vehicle, and/or an interpolation or anticipation of the expected location and/or velocity of that vehicle.

Step 608 is shown as sequentially following step 606 in the method 600 for ease of explanation and example. However, in practice, step 608 (or an equivalent step) may be executed at any time during the method 600.

In some cases, the fleet of vehicles may be a mixed fleet, meaning that the fleet is comprised of both human-operated vehicles as well as self-driving vehicles and/or automated-guided vehicles. In these cases, the broadcast stream received during step 608 may include location and/or velocity information pertaining to self-driving vehicles and/or automated-guided vehicles as well as other human-operated vehicles.

By using the fleet manager broadcast stream approach of method 600, all of the vehicles in the fleet can be periodically updated with the location and velocity of all of the other vehicles in the fleet. According to some embodiments, a first subset of vehicles in the fleet can be periodically updated with the location and velocity of a second subset of vehicles in the fleet, for example, using a multi-casting scheme that provides for message updated to subsets of the fleet.

In some cases, method 600 may represent a preferred approach, since it allows all of the vehicles to know the location and/or velocity of all of the other vehicles at one time. Since a single broadcast stream is aggregated by the fleet manager and broadcast to the entire fleet—rather than sending a multitude of individual vehicle-to-vehicle messages—simplicity and efficiency can be achieved. Furthermore, since all of the vehicles are regularly updated with the location and velocity of every other vehicle, it is possible, according to some embodiments, for each vehicle to interpolate or anticipate the future location of other vehicles (for a short period of time in the future) in the event that there is a temporary communications failure from the fleet manager or if a periodic broadcast from the fleet manager is not received by a particular vehicle.

Referring to FIG. 6B, at step 656, the method 650 sends the location and/or velocity information from a particular vehicle to another particular vehicle or group of vehicles. For example, groups of vehicles can be defined based on location or proximity, based on type of vehicle, based on the current type of task or mission of the vehicle, and based on a status of a vehicle (e.g. carrying a payload or empty).

In the event that a group is defined based on location (i.e. proximity), a vehicle may send its location and/or velocity information to only those vehicles that are within a certain distance from the vehicle. This may be useful, for example, in order to avoid traffic congestion or mitigate situations with the potential for collision. Generally speaking, if the location and/or velocity information of a vehicle is sent to only those vehicles within a certain proximity, it is because the location and/or velocity of a vehicle that is sufficient far away is effectively irrelevant.

In step 656, the location and/or velocity information may be sent to each of the other vehicles individually (i.e. each vehicle receives the updated location/or velocity information in series), or simultaneously (i.e. all vehicles receive the updated location and/or velocity information in parallel).

According to some embodiments, step 656, may include sending location and/or velocity information to the fleet manager so that the fleet manager can subsequently relay the information to a particular vehicle or group of vehicles. As such, the fleet manager may be responsible for addressing the information to the recipient vehicle(s) and/or defining the group of vehicles that will receive the information.

Thus, according to some embodiments, the method 650 may use inter-vehicular communications, and the group of recipient vehicles may be determined by the type of communications. For example, if wireless telecommunications signals, optical signals, or auditory signals are used, then the group of vehicles that receive the signals may be defined by the intrinsic limits of those signals—i.e. only those vehicles that are within a certain radio range, or within range of a certain wireless router, or within a certain group of wireless protocol addresses, or within line-of-sight, or within a certain auditory range, etc., may receive the signal.

Additionally, or alternatively, the method 650 may allow the fleet manager to determine the group of vehicles intended to receive the location and/or velocity information. For example, the fleet manager may be able to determine a group of recipient vehicles based on an arbitrarily-established distance between vehicles (i.e. proximity), type of vehicle, current task or mission, vehicle status, etc., which are known to the fleet manager but not necessarily known to any particular vehicle at any particular time.

At step 658, the vehicle receives updated location and/or velocity information from other vehicles in the fleet. According to some embodiments, the updates may be received periodically or intermittently. Each update received generally includes the updated location and/or velocity information according to the group to which the vehicle may belong.

Step 658 is shown as sequentially following step 656 in the method 650 for ease of explanation and example. However, in practice, step 658 (or an equivalent step) may be executed at any time during the method 650.

In some cases, the fleet of vehicles may be a mixed fleet, meaning that the fleet is comprised of both human-operated vehicles as well as self-driving vehicles and/or automated-guided vehicles. In these cases, the update received during step 608 may include location and/or velocity information pertaining to self-driving vehicles and/or automated-guided vehicles as well as other human-operated vehicles. Similarly, in regards to step 656, location and/or velocity information may be sent to other vehicles including self-driving vehicles and automated-guided vehicles.

Both the method 600 and the method 650 may notify a human operator of the vehicle with respect to the location and/or velocity of other vehicles at step 610.

Figure 7:
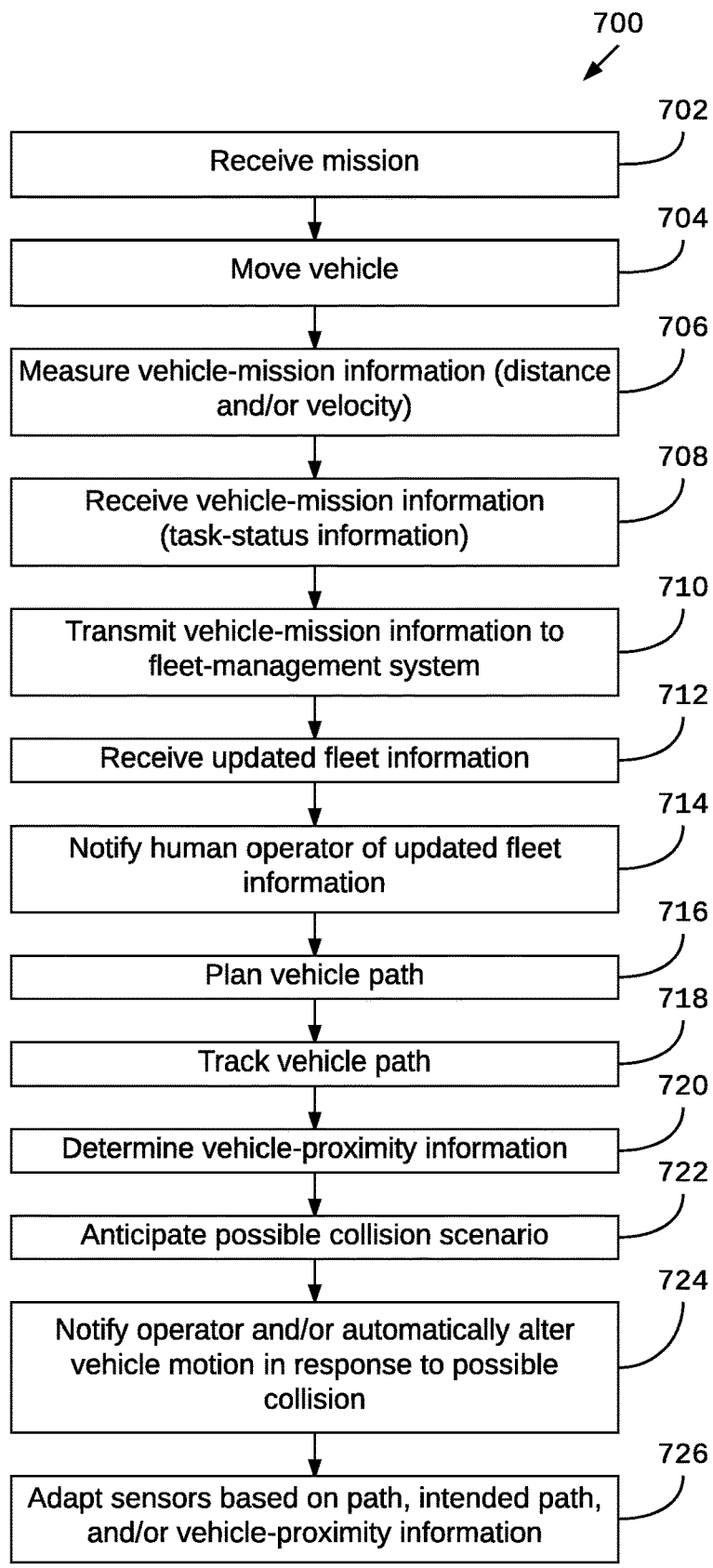
FIG. 7 is a flow diagram showing a method of using a human-operated material-transport vehicle with a fleet-management system, according to some embodiments.

Referring to FIG. 7, there is shown a flow-diagram depicting a method 700 of using a human-operated material-transport vehicle with a fleet management system. A person skilled in the art will appreciate that various steps in the algorithm may be omitted or performed in different sequences while still achieving a method of using a human-operated material-transport vehicle with a fleet-management system.

The method may begin, in some cases, at step 702 when the vehicle receives a mission from the fleet-management system. The mission may comprise one or more tasks and/or be associated with one or more destinations. Typically, though not always, a mission or an individual task may be dispatched by the fleet-management system as part of, or along with an enterprise resource planning system.

At step 704, the vehicle moves from a first location to a second location. For example, the vehicle movement may be caused by the human operator of the vehicle, and may be in accordance with a vehicle path as provided by the fleet-management system and/or a driver-support system.

At step 706, vehicle-mission information is measured. In some cases, the measured vehicle-mission information may relate to the distance (or displacement) or speed (or velocity) of the vehicle. For example, a sensor of a driver-support system can obtain measurements of the vehicle-mission information.

At step 708, vehicle-mission information is received. The vehicle-mission information that is received at step 708 may be in addition to, or instead of the vehicle-mission information measured during step 706. In some cases, the received vehicle-mission information may relate to the status of a task (e.g. a mission may comprise a sequence of tasks). For example, a human operator of a vehicle may use a task-input device on a driver-support system to indicate when a task has been completed, or other status information related to a task.

At step 710, the vehicle-mission information that was measured during step 706 and/or received during step 708 may be transmitted to the fleet-management system. According to some embodiments, vehicle-mission information may be transmitted in response to the vehicle-mission information being measured and/or received. In some embodiments, the current (or most recent) vehicle-mission information known to the driver-support system may be periodically or intermittently transmitted to the fleet-management system, such as, according to a schedule.

At step 712, updated fleet information is received. The fleet information generally pertains to the vehicle-mission information of other vehicles in the fleet. In some cases, other vehicles in the fleet may be human-operated material-transport vehicles, and/or driverless vehicles. For example, the fleet information may include the location and/or velocity of other vehicles in the fleet. In some cases, the fleet information may include task-status information pertaining to other vehicles in the fleet. Fleet information may be updated via a broadcast stream that is sent to multiple vehicles in the fleet simultaneously. In some cases, fleet information may be updated directly from other vehicles in the fleet. Fleet information updates may be sent to particular groups of vehicles in the fleet (e.g. based on location, vehicle type, mission type, etc.), or the same fleet information updates may be sent to all vehicles in the fleet.

At step 714, a human operator is notified of the updated fleet information that was received during step 712. In some cases, the human operator may be updated using a human-vehicle interface associated with a driver-support system. For example, the human-vehicle interface may include a graphical display that displays a map of the environment, and indicates the other fleet vehicles that are operating within the environment.

At step 716, a vehicle path is planned. The vehicle path may be planned based on any or all of a mission or task, a destination location, a map, and fleet information (e.g. location, velocity, etc. of other vehicles). The vehicle path may be planned by the driver-support system that is mounted on the vehicle. Additionally, or alternatively, the vehicle path planning may include the use of a fleet-management system in communication with the driver-support system. The vehicle path may be planned in association with the use of a path-planning application.

At step 718, the movement of the vehicle is tracked relative to the vehicle path that was planned during step 716. In some cases, tracking the vehicle path may involve receiving input from a sensor of the driver-support system, receiving input from a human-vehicle interface or vehicle-control interface associated with the driver-support system, and/or in association with a localization application. The movement of the vehicle may be tracked in association with the use of a path-tracking application.

At step 720, vehicle-proximity information is determined. Vehicle-proximity information includes information about any objects that are within a certain proximity of the vehicle. According to some embodiments, vehicle-proximity information may be determined based on any or all of input from a sensor of the driver-support system, the objects known in a map of the vehicle's environment, the velocity and/or direction of travel of the vehicle, and the current location and velocity (or vehicle path) of the other vehicles in the fleet (e.g. fleet information).

At step 722, possible collision scenarios are anticipated. In some cases, possible collision scenarios may be anticipated based on any of the vehicle-proximity information determined during step 720, a map of the vehicle's environment, fleet information received during step 712, etc. Collision scenarios may be anticipated in association with the use of a collision-avoidance application.

At step 724, a human operator may be notified that a possible collision was anticipated during step 722, and/or the motion of the vehicle may be automatically altered by the driver-support system in response to a possible collision that was anticipated during step 722. The notification and/or automatic alteration of the vehicle's motion may be accomplished in association with the use of a collision-avoidance application.

At step 726, a sensor of a driver-support system may be altered base on any or all of the vehicle path planned during step 716 (e.g. an '"intended" path of the vehicle), the tracked-path (e.g. based on the differences between the planned vehicle path and the actual location and/or velocity of the vehicle as tracked during step 718), and the vehicle-proximity information that was determined during step 720. A sensor of the driver-support system may be altered, for example, by changing the orientation of the sensor (e.g. with an actuator), and/or by changing the configuration of the sensor.

For example, if a sensor is located at the front of the vehicle, and the vehicle is traveling in a straight line in the forwards direction, the sensor may generally detect objects that are ahead of the vehicle, with a field and range that are symmetrically disposed about a mid-line of the vehicle. In response to particular events (e.g. the vehicle is turning, the vehicle is expected to turn, an object is expected to be present adjacent the vehicle, a possible collision with an object is anticipated, etc.), the sensor may be adapted so that it can better detect the vehicle's environment according to the particular event.

In some cases, an actuator may be used to change the orientation of the sensor, for example, by turning it in accordance to the curve of the vehicle's path or towards an expected object. In some cases, the sensor may be configured so that the sensor's field of detection is oriented in accordance to the curve of the vehicle's path or towards an expected object.

Figure 8:
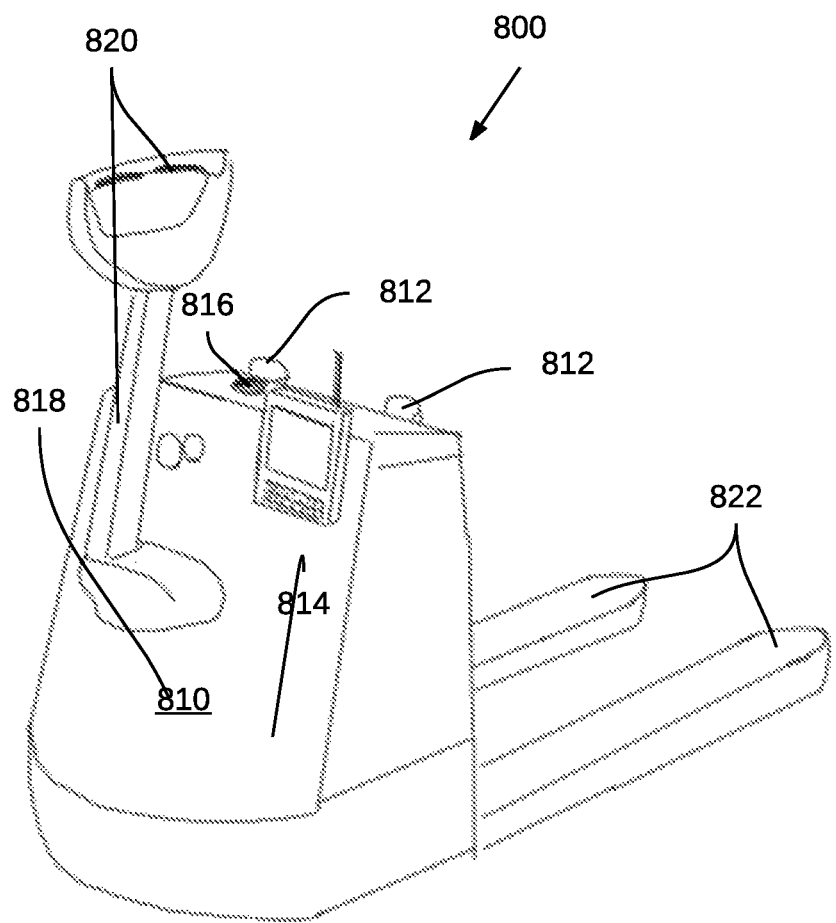
FIG. 8 is an orthographic view of a pallet jack human-operated material-transport vehicle equipped with a driver-support system according to some embodiments.

Referring to FIG. 8, there is shown a system 800 for using a human-operated material-transport vehicles with a fleet-management system. The system 800 comprises a pallet jack 810 and a driver-support system that includes sensors 812 that have been added to the pallet jack 810, a computing device 814 mounted on the pallet jack 810 for use by a human operator, and a button 816 for obtaining task-status information from the human operator.

In some cases, the pallet jack 800 may be powered, for example, by an electric motor that drives wheels (not shown) on the underside of the pallet jack 800. A human operator may control the movement of the pallet jack 800 by using buttons 820 that are part of the original human-vehicle interface equipment of the pallet jack 800. The original human-vehicle interface equipment of the pallet jack 800 generally allow a human user to move the pallet jack 800 (e.g. control the motor, steering, brakes, etc.) as well as the pallet fork 822.

The pallet jack 800 may also include other human-vehicle interface devices that comprise the original equipment of the pallet jack 800. For example, visual displays 818 may indicate the current state of charge of a battery on the pallet jack 800, the current speed of the pallet jack 800, etc.

According to some embodiments, the computing device 814 includes a display screen (which may be a touch screen), a keypad for providing input from a human operator, and an antenna for providing a communications link between the computing device 814 and a fleet-management system via a transceiver in the computing device 814.

According to some embodiments, the task-status button 816 may be included in the driver-support system even though the input from the task-status button 816 may be redundant to the input that could also be provided via the keypad on the computing device 814. In some cases, the particular type, size, and placement of the task-status may be selected so that the task-status button 814 is simple and intuitive to operate during the course of human operator's duties related to a task. For example, the task-status button 816 may be used to indicate that the current task has been completed. As such, a human operator may be able to activate the task-status button 816 with greater ease than by providing manual input through the keypad of the computing device 814. In some cases, when the task-status button 816 is easier and/or more intuitive for a human operator to use, there is a greater likelihood that the human operator will update the status of a task.

The present invention has been described here by way of example only. Various modification and variations may be made to these exemplary embodiments without departing from the spirit and scope of the invention, which is limited only by the appended claims.

We claim:

1. A method of using a human-operated material-transport vehicle with a fleet-management system, comprising:
   operating a driver-support system mounted to the human-operated material-transport vehicle, the driver-support system comprising a processor operable to:
      receive a mission definition from the fleet-management system, wherein the mission definition comprises one or more tasks to be conducted by the human-operated material-transport vehicle;
      plan a path based on the mission definition;
      display the path via a human-vehicle interface to assist the operator of the human-operated material-transport vehicle to conduct the one or more tasks;
      monitor and collect a vehicle-mission information associated with an operation of the human-operated material-transport vehicle by the operator within an industrial facility associated with the fleet-management system, wherein the driver-support system comprises:
         at least one sensor for determining at least one of a vehicle location and a vehicle velocity; and
         a task-input device for receiving one or more user inputs from the operator for providing a task-related data; and
      transmit the vehicle-mission information to the fleet-management system during the operation by the operator of the human-operated material-transport vehicle for completing the one or more tasks;
   during the operation by the operator of the human-operated material-transport vehicle for completing the one or more tasks:
      operating the fleet-management system to:
         determine, based on the at least one of the vehicle location and the vehicle velocity and a fleet status of one or more other vehicles operating within the industrial facility, of one or more potential collisions between the human-operated material-transport vehicle and the one or more other vehicles; and
         determine, based on the one or more user inputs, a task status of the one or more tasks being conducted by the human-operated material-transport vehicle; and
         generate and transmit to the driver-support system a collision notification associated with the one or more potential collisions and an updated mission definition based the task status; and
      operating the driver-support system to:

in response to receiving the collision notification, generating a collision alert via the human-vehicle interface to warn the operator of the one or more potential collisions;
update the path based on the updated mission definition; and
display the updated path via the human-vehicle interface.

2. The method of claim 1, wherein the vehicle-mission information comprises at least one of the vehicle location and vehicle velocity determined by the at least one sensor.

3. The method of claim 2, wherein operating the human-operated material-transport vehicle within the industrial facility is associated with the one or more tasks, and the vehicle-mission information further comprises mission information pertaining to a status of the one or more tasks.

4. The method of claim 1, wherein operating the human-operated material-transport vehicle within the industrial facility is associated with the one or more tasks, and the vehicle-mission information comprises mission information pertaining to a status of the one or more tasks.

5. The method of claim 1, wherein the one or more other vehicles comprises at least two other vehicles, and the driver-support system is operated to receive a broadcast stream from the fleet-management system comprising an aggregation of location and speed information pertaining to each of the at least two other vehicles.

6. The method of claim 1, further comprising operating the driver-support system to receive vehicle-mission information from the one or more other vehicles.

7. The method of claim 1, further comprising operating the driver-support system to:
receive a destination location; and
plan the path for the human-operated material-transport vehicle based on the destination location.

8. The method of claim 7, further comprising operating the driver-support system to receive fleet information, wherein operating the driver-support system to plan the path for the human-operated material-transport vehicle is based on a map provided by the driver-support system and the fleet information.

9. The method of claim 1, further comprising operating the driver-support system to determine vehicle-proximity information associated with the human-operated material-transport vehicle, and operating the driver-support system to perform collision-avoidance based on the vehicle-proximity information.

10. A driver-support system mounted to a human-operated material-transport vehicle and in communication with a fleet-management system, the driver-support system comprising:
at least one sensor operable to determine at least one of a vehicle location and a vehicle velocity;
a task-input device for receiving one or more user inputs from an operator of the human-operated material-transport vehicle for providing a task-related data;
a human-vehicle interface; and
a transceiver for communicating with the fleet-management system;
a processor operable to communicate with the at least one sensor, the task-input device, the human-vehicle interface and the transceiver, the processor being operable to:
receive a mission definition from the fleet-management system, wherein the mission definition comprises one or more tasks to be conducted by the human-operated material-transport vehicle;
plan a path using a mapping application and a localization application based at least on information received from the at least one sensor and the mission definition;
display the path via the human-vehicle interface to assist the operator of the human-operated material-transport vehicle to conduct the one or more tasks;
monitor and collect a vehicle-mission information associated with an operation of the human-operated material-transport vehicle by the operator within an industrial facility associated with the fleet-management system, wherein the vehicle-mission information comprises:
at least one of a vehicle location and vehicle velocity determined by the at least one sensor; and
one or more user inputs from the operator providing a task-related data via the task-input device;
during the operation by the operator of the human-operated material-transport vehicle for completing the one or more tasks:
transmit the vehicle-mission information to the fleet-management system;
receive from the fleet-management system:
a collision notification associated with one or more potential collisions between the human-operated material-transport vehicle and one or more other vehicles operating within the industrial facility based on the at least one of a vehicle location and vehicle determined by the at least one sensor; and
an updated mission definition generated based on a task status determined by the fleet-management system from the one or more user inputs received via the task-input device;
in response to receiving the collision notification, generate a collision alert via the human-vehicle interface to warn the operator of the one or more potential collisions;
update the path based on the updated mission definition; and
display the updated path via the human-vehicle interface.

11. The system of claim 10, wherein the processor is configured to provide the mapping application and the localization application using a simultaneous localization and mapping ("SLAM") application.

12. The system of claim 10, wherein the processor is further configured to provide a path-planning application for planning a vehicle path based on a destination location.

13. The system of claim 12, wherein the processor is further configured to provide a path-tracking application for tracking a movement of the vehicle relative to the vehicle path.

14. The system of claim 13, wherein the processor further configured to provide a collision-avoidance application for predicting possible collisions between the vehicle and a second vehicle.

15. The system of claim 14, wherein the processor is further configured to provide a strategy management application for processing information pertaining to a vehicle mission.

16. The system of claim 10, further comprising a vehicle-control interface for at least one of sending vehicle control information to the vehicle, and receiving vehicle control information from the vehicle.

17. A non-transitory computer-readable media comprising one or more instructions executable on a processor for operating a driver-support system mounted to a human-operated material-transport vehicle with a fleet-management system, the processor is operable to:
- receive a mission definition from the fleet-management system, wherein the mission definition comprises one or more tasks to be conducted by the human-operated material-transport vehicle;
- plan a path based on the mission definition;
- display the path via a human-vehicle interface to assist the operator of the human-operated material-transport vehicle to conduct the one or more tasks;
- monitor and collect a vehicle-mission information associated with an operation of the human-operated material-transport vehicle by the operator within an industrial facility associated with the fleet-management system, wherein the driver-support system comprises:
  - at least one sensor for determining at least one of a vehicle location and a vehicle velocity; and
  - a task-input device for receiving one or more user inputs from the operator for providing a task-related data; and
- during the operation by the operator of the human-operated material-transport vehicle for completing the one or more tasks:
  - transmit the vehicle-mission information to the fleet-management system;
  - receive from the fleet-management system:
    - a collision notification associated with one or more potential collisions between the human-operated material-transport vehicle and one or more other vehicles operating within the industrial facility based on the at least one of a vehicle location and vehicle determined by the at least one sensor; and
    - an updated mission definition generated based on a task status determined by the fleet-management system from the one or more user inputs received via the task-input device;
  - in response to receiving the collision notification, generate a collision alert via the human-vehicle interface to warn the operator of the one or more potential collisions;
  - update the path based on the updated mission definition; and
  - display the updated path via the human-vehicle interface.

* * * * *